July 7, 1959
W. W. HARPER ET AL
2,893,088
SAFETY BELT BUCKLE
Filed April 27, 1956
2 Sheets-Sheet 1
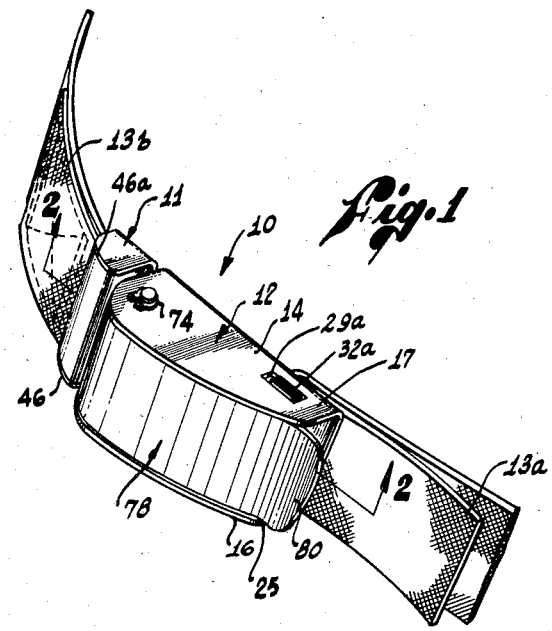
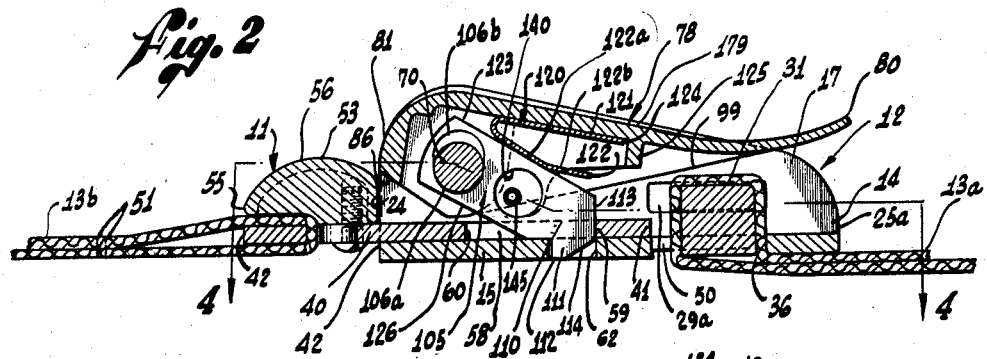
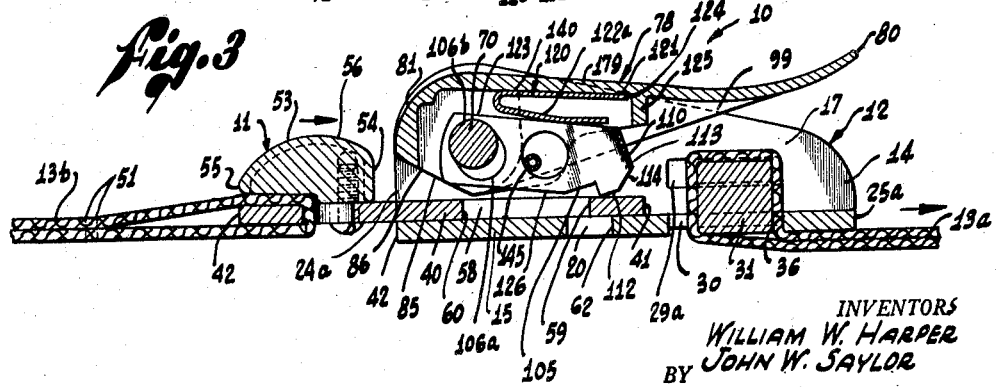
INVENTORS
WILLIAM W. HARPER
JOHN W. SAYLOR
BY
Gulwider Mattingly & Huntley
ATTORNEYS

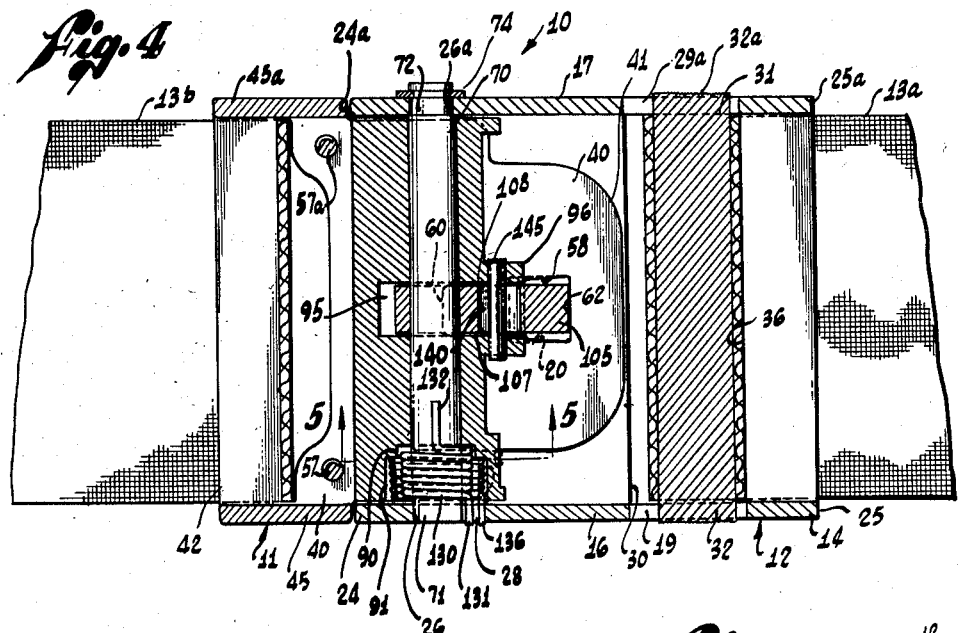
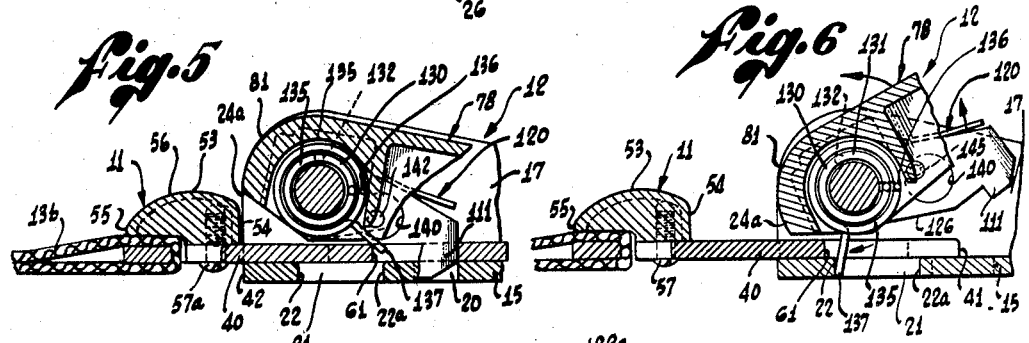
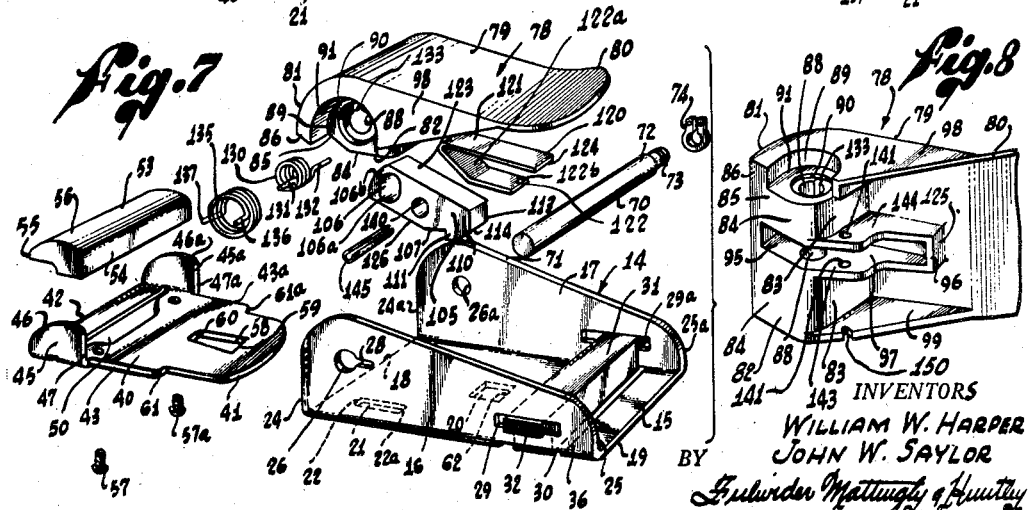

United States Patent Office 2,893,088
Patented July 7, 1959

2,893,088

SAFETY BELT BUCKLE

William W. Harper and John W. Saylor, Pasadena, Calif., assignors to Automotive Safety Associates, South Pasadena, Calif., a corporation of California Application April 27, 1956, Serial No. 581,047

9 Claims. (Cl. 24—75)

This invention relates to safety belts and is particularly concerned with improvements in safety buckles therefor. Generally, safety belts for use in automobiles, airplanes, and the like are composed of two belt sections, one end of each sections being affixed to a bracket which is, in turn, affixed in the automobile or airplane. The free ends of the mating belt pieces are frequently made of metal, although any rigid and tough material would suffice.

Safety buckles of this so-called metal on metal type are known which provide positive locking of the two separate belt pieces. However, one of the disadvantages of positive locking mechanisms in metal on metal safety belts is the tendency for the lock to remain in a locking position even after manual force has been applied to release it.

Another disadvantage of positive locking systems in metal on metal safety belts is that at the time of an accident, or other emergency, when the wearer of the belt has but one hand free, it is difficult to release oneself from the confines of the belt unless worn tightly around the body. It is, then, at such dangerous moments that the safety positive locking feature of a safety belt may, incongruous as it may seem, doom the wearer.

More specifically, the positive locking safety belts known to us do not provide a means for automatically disengaging the two belt sections by the application of a single actuating force. A metal on metal belt buckle so constructed as to be capable of being unlocked without immediately being automatically disengaged is inadequate for its purpose; the mere applying of force on the belt buckle lock release with one free hand does not necessarily prevent the locking mechanism from slipping back into locking position to thereby lock the two belt pieces if there has been no positive disengagement of the belt pieces concurrent with the unlocking step.

Accordingly, it is a major object of the present invention to provide a positive lock buckle capable of being unlocked and positively disengaged by the application of a single force.

It is a further object of the present invention to provide a safety buckle which has a positive locking means combined with a means for simultaneously and automatically ejecting one buckle piece away from the other as the belt buckle is unlocked.

These and other objects and advantages of the present invention will be apparent from the following detailed description and the accompanying drawings, in which:

Figure 1 is a perspective view of one preferred embodiment of the present invention showing a metal on metal safety belt buckle attached to a belt;

Figure 2 is a cross-section on the line 2—2 of Figure 1 showing the belt buckle in locked position;

Figure 3 is a cross-section along the line 2—2 of Figure 1, showing the belt buckle just prior to the locking thereof;

Figure 4 is a plan view along the line 4—4 of Figure 2;

Figure 5 is a cross-section along the line 5—5 of Figure 4, showing the buckle in a locked position;

Figure 6 is a cross-section along the line 5—5 of Figure 4, showing the buckle in an unlocked and disengaged position;

Figure 7 is an exploded view of the belt buckle shown in Figure 1; and

Figure 8 is a perspective view of the underside of the release hood of the belt buckle of the present invention.

In general, the belt buckle consists of two rigid pieces, a linking member and a lock-release member. The linking member is adapted to be inserted within the lock-release member and when properly aligned with respect thereto, is forcibly locked therein by a first spring means. When the buckle is unlocked by application of an actuating force opposing the first spring means, a second spring means simultaneously acts upon the linking member forcibly ejecting it from within the lock-release member.

Referring now to Figure 1, the belt buckle, designated generally by the numeral 10, comprises a linking section 11 which locks into a lock-release section 12 in a manner to be hereafter described. Two belt pieces 13a and 13b are attached to the lock-release section 12 and the linking section 11, respectively, thereby forming the safety belt of the present invention.

Referring now especially to Figure 3, the linking section 11 consists essentially of a flat link plate 40 adapted to be slidably received within the channel 14 of lock-release section 12. The channel 14 and link plate 40 have apertures 20 and 58 formed therein, respectively, which, when the linking member is inserted within the channel 14 to an appropriate point, are aligned.

The lock-release section 12 is provided with an outer lock-release hood 78 and a lock bar 105 pivotally mounted about stationary bolt 70. The lock bar 105 is forced away from the hood 78 by lock bar spring 120 and inwardly toward the channel floor 15 of channel 14.

The hood 78 is forced inwardly towards the channel floor by means of a torsion spring, the action of which is to be described in detail hereinafter, thereby forcing the lock bar 105 by means of the lock bar spring contact inwardly within the two apertures 20 and 58 of the respective lock-release and linking sections when they are aligned, thereby locking the buckle.

Referring now especially to Figures 4–6, an ejector spring 135 is rotatably mounted about bolt 70 having one end stably mounted within lock-release member 12 and the other end 137 abutting, under tension, on a side edge shoulder 61 of link plate 40 in a manner to be described in detail hereinafter. Thus, as the lock bar 105 is released from within apertures 20 and 58, the link plate 40 is free to move and will be slidably ejected under the influence of the force exerted by the ejector spring end 137 in attempting to assume a relatively unstressed position.

Referring now especially to Figure 7, as well as to Figure 1, the lock-release section 12 has a U-shaped base channel 14 consisting of a floor plate 15 and two side plates 16 and 17 affixed to the side edges thereof. The channel 14 is preferably made from one piece of metal curved upwardly to form the said side plates 16 and 17. The floor plate 15 is preferably rectangular in shape and has a generally square locking aperture 20 approximately centrally located therein. An elongated ejector finger slot 21 is formed in the floor plate 15 adjacent the side plate 16 and parallel thereto. The rear edge 22 of said slot 21 lies preferably adjacent the rear edge 18 of said floor plate 15; the forward edge 22a preferably lies rearward of aperture 20.

The side plates 16 and 17 have bolt holes 26, 26a respectively formed therein near the higher rearward edges 24, 24a, the bolt holes being transversely co-aligned. Retaining slot 28 is formed in side plate 16 adjacent bolt hole 26 and is preferably formed having one end opening therein.

Referring now especially to Figures 2, 3, and 4, as well as to Figure 7, elongated rectangular transversely co-aligned bar slots 29, 29a are provided near the forward edges 25, 25a in the side plates 16 and 17, respectively, co-aligned with a transverse floor bar slot 30 formed in the floor 15. A rectangular adjustment bar 31, having projecting knurled ends 32, 32a is seated within floor bar slot 30 and is slidably movable therein parallel to the longitudinal channel axis. The knurled ends 32, 32a project through bar slots 29 and 29a respectively.

In attaching the belt piece 13a to channel 14 one end thereof is affixed to a relatively stationary object, for instance, the floor of an automobile by any suitable means (not shown). The free end of the belt piece 13a is then passed upwardly through the floor bar slot 30 around the adjustment bar 31 and thence downwardly through the floor bar slot 30, and beneath the floor plate 15 toward the rearward edge 19 thereof. As the belt piece 13a is stretched taut, it is clamped between the lower edge of rearward edge face 35 of adjustment bar 31 and the rearward edge 36 of floor bar slot 30. To adjust the length of belt piece 13a, it is merely necessary to relieve the tension thereon thus relieving the aforementioned clamping action; manual force is then exerted on the belt piece in the appropriate direction to obtain the desired length. For instance, to shorten the belt piece 13a, the free end of the belt piece is moved in the direction of the arrow in Figure 3.

Referring now especially to Figure 7, the link section 11 of the buckle 10 is provided with a link plate 40 having preferably a slightly convexly curved leading edge 41, a straight trailing edge 42, and a pair of symmetrical irregularly shaped side edges 43 and 43a.

The side edges 43 and 43a are bent normal to the plane of link plate 40, adjacent the trailing edge 42 thereof to form ears 45 and 45a, respectively. The ears 45 and 45a have curved upper edges 46 and 46a respectively, said upper edges tapering downwardly in a smooth curve from leading edges 47, 47a towards the link plate trailing edge 42 to aid in conveying a streamlined appearance to the buckle 10. A transverse link belt slot 50 is provided in the link plate 40 between the ears 45 and 45a.

Referring now to Figure 2 or Figure 3, the free end of belt piece 13b of the belt 13 is passed through the link belt slot 50 and then doubled back onto the main body portion of the belt piece where it is affixed thereto in any suitable manner as by stitching, shown at 51.

A belt housing 53, which comprises a hollow cover having a leading end face 54, a trailing edge 55, and an upper convex face 56, fits over belt slot 50 between ears 45 and 45a so that the belt housing trailing edge lies adjacent the link plate trailing edge 42. The housing 53 is affixed to the link plate 40 in any suitable manner, as for example, by attaching screws 57 and 57a.

The belt housing 53 has its upper convex face 56 preferably conforming to the contour defined by upper edges 46 and 46a of ears 45 and 45a respectively. The trailing edge 55 of belt housing 53 does not lie flush against the link plate 40 but rather is spaced therefrom so that as the belt housing 53 is securely mounted on link plate 40, the housing trailing edge 55 contacts the belt piece 13b without exerting any undue pressure thereon.

Referring now to Figure 7 as well as Figures 2 and 3, a link aperture 58 is provided in the link plate 40 having its longitudinal axis along the central longitudinal axis of said link plate. The leading edge 59 of the aperture 58 is preferably slightly wider than the trailing edge 60 thereof, the side edges of the link aperture being symmetrical about the longitudinal axis of the link plate 40.

Referring now especially to Figures 5 and 6, as well as to Figure 7, shoulders 61, 61a are formed in side edges 43, 43a respectively, the said shoulders lying preferably in the plane of link plate 40, and preferably substantially normal to the longitudinal axis thereof. The width between side edges of the link plate 40 in the section defined by the shoulders 61, 61a and link ear leading edges 47, 47a is such that the link plate is enabled to be slidably movable in channel 14, the forward movement of the link plate in the channel (towards the adjustment bar 31) being arrested by contact of rearward edges 24, 24a of side plates 16 and 17 with the leading edges 47, 47a of link ears 45, 45a. When the link plate 40 and the channel 14 are in the just described position (as shown in Figure 2) the leading edge 59 of the link aperture 58 and the rearward edge 62 of the channel aperture 20 are aligned, thereby enabling the link section 11 and the channel 14 to be locked together by an appropriate locking mechanism inserted within the aligned apertures in a manner to be hereafter described. Further, the shoulder 61 and the forward edge 22a of slot 21 lie adjacent each other, as is best seen in Figure 5.

An elongated bolt 70 is rigidly mounted in bolt holes 26 and 26a between channel side plates 16 and 17 respectively. The bolt end 71 is press fitted into bolt hole 26; the other smaller bolt end section 72 passes through bolt hole 26a and is provided with a circumferential snap ring groove 73 in which a snap ring 74 is tightly fitted to securely lock the bolt 70 in place as is best seen in Figures 1 and 4.

Referring now especially to Figures 2, 3, 7, and 8, a lock-release hood 78 is pivotally mounted about bolt 70 in a manner to be described. The lock-release hood 78 comprises a central roof plate 79 having a width substantially equal to that of floor plate 15, to the front end of which is affixed a slightly upturned tab plate 80 and to the rear end of which is affixed a downwardly circular eave plate 81. A thickened under housing 82, affixed to the underside of roof plate 79 and to the underside of eave 81 extends transversely across the release hood 78, and is defined by a front end face 83, approximately normal to the plane of the roof plate 79, having a lower rounded corner which tapers into a bottom face 84. The housing bottom face 84 is beveled upwardly in its forward section 85 to meet the lower beveled face 86 of eave 81 in a straight line as is best seen in Figure 7.

A transversely extending circular bore 88 is provided in housing 82 of release hood 78, the bore being preferably enlarged stepwise at one end 89 thereof to form cylindrical spring cavities 90 and 91 as is best seen in Figure 4.

The housing 82 has also formed therein a central longitudinal, preferably rectangular, lock bar cavity 95 extending from the underside of eave 81 to rear face 83. A U-shaped frame 96 is affixed to the roof plate 79 and is coaligned with lock bar cavity 95 to form an elongated rectangular lock bar recess 97, as is best seen in Figure 8.

Bolt 70 passes through bore 88 of housing 82 to pivotally mount said housing thereon. The housing 82 is prevented from moving in a transverse direction within the channel 14 by having affixed to the opposite sides of roof plate 79 somewhat triangularly-shaped parallel hood side plates 98 and 99 immediately adjacent channel side plates 16 and 17, respectively. The pivotal movement of the hood 78 inwardly (towards the floor plate 15) is thus limited by the contact of the lower edges of hood side plates 98, 99 with belt piece 13a wound around adjustment bar 31, as best seen in Figure 2.

The entire lock-release hood 78, including the roof plate 79, tab-plate 80, eave 81, underhousing 82, frame 96, and hood side plates 97, 98 are preferably formed as a single unit as by a die casting operation.

Referring now especially to Figures 2, 3, and 7, a lock bar 105, having a width substantially equal to trailing edge 60 of link aperture 58, is slidably and pivotally mounted on the bolt 70, and is slidably enclosed by the walls of lock bar recess 97. The lock bar 105 is provided with an elongated slide-pivot opening 106, having rounded ends 106a and 106b, at one end thereof whereby the said lock bar is slidable outwardly and inwardly, as well as rotatable, about bolt 70. However, the transverse motion of the lock bar 105 along bolt 70 is substantially completely restricted by the slidable contact of the walls of recess 97 with the side faces 107 and 108 of the lock bar, as is best seen in Figure 4.

The free end 110 of the lock bar 105 is provided with a protruding hook member 111, the hook member being preferably rectangular in cross-section and having its transverse dimension slightly less than the transverse dimension of the floor aperture 20 and the leading edge 59 of the variable width link aperture 58, but substantially equal to the trailing edge 60 thereof. Thus, as the lock bar 105 is seated within apertures 20 and 58, as shown in Figures 2 and 4, it is wedged within aperture 58 near the trailing edge 60 thereof, the initial penetration being accomplished at the wider edge of the apertures. The underface 112 of the hook member 111 is upwardly beveled from the approximate mid-point of the said underface to the forward end face 113 of the lock bar 105. The bevel 114 so formed facilitates the removal of hook member 111 from either aperture 20 or both apertures 20 and 58.

A lock bar spring 120, adapted to force the lock bar 105 into locking position within the channel and link apertures 20 and 58, respectively, comprises preferably an outer leaf 121 and an inner leaf 122 affixed to one end of said outer leaf forming an acute angle therebetween when the spring is unstressed. The spring 120 is best seen in relatively unstressed position in Figures 2 and 7. The outer leaf 121 abuts the underside of roof plate 79, the rearward section 122a of inner leaf 122 abuts the outer face 123, and the free end 124 of outer leaf 121 abuts the crosspiece 125 of frame 96 to prevent the spring 120 from slipping forwardly.

The hood 78 is forced inwardly by a torsion spring mechanism to be described, the transmittance of this force to the lock bar 105 being accomplished by means of the spring 120. The lock bar 105 is thus positively retained within either aperture 20 above or both apertures 20 and 58, depending upon whether the buckle 10 is unlocked and disengaged or locked.

Referring now especially to Figures 4 through 6, a helical torsion spring 130, having an inner diameter substantially equal to the outer diameter of bolt 70 is mounted about bolt end 71. The torsion spring 130 has two end fingers 131 and 132, each extending parallel to the axis of the bolt 70, finger 131 being retained within side plate retaining slot 28, the other finger 132 being retained in a torsion finger slot 133, which runs parallel to the bore 88, for a short distance towards the central axis of the channel 14. The slot 133 is preferably formed directly above the axis of, and opening onto, the bore 88 when the release hood is in locked position, as is best shown in Figures 2, 4 and 5.

The normal unstressed position of fingers 131 and 132 of spring 130 occurs when the fingers are co-aligned as shown in Figure 7. The slots 28, 133 in which spring fingers 131, 132 are retained, are however never aligned regardless of the position of the lock-release hood 78 with respect to channel 14. Rather, in the locked position shown in Figure 5, the slots 122, 28 of lock release hood 12 and channel 14 respectively are preferably approximately formed at right angles to each other. The spring fingers 131, 132 placed within slots 28, 133 are this spread apart, under tension, causing the hood 78 to be forced inwardly towards the floor plate 15.

As the hood 78 is forced outwardly in the direction of the arrow in Figure 6, the torsion slot 133 moves with the hood 78 away from the retaining finger slot 28, thereby creating an even greater spring tension in a direction opposing the outward force. The release hood 78 is held as close to the floor plate 15 as possible by means of torsion spring 130 in the manner just described, and the release hood in turn forces the hook member 111 of lock bar 105 into the channel aperture 20 or both apertures 20 and 58 by means of the lock spring connection 120.

In order to lock the link section 11 within channel 14, the link section 11 is moved in the direction of the arrow in Figure 3. The link plate leading edge 41 first strikes the inner face 126 of lock bar 105 deflecting it outwardly and forwardly from aperture 20. As the link plate leading edge 41 moves further forwardly, the lock bar 105 moves outwardly and forwardly from within aperture 20, its outward and forward movement being restricted by the downward force exerted thereupon by means of torsion spring 130, hood 78, and spring connection 120 in the manner described. As leading edge 47, 47a of link ears 45, 45a respectively, of the link plate 40 contact the rearward edge 24, 24a of channel side plates 16, 17, respectively, the edges 59, 62 of apertures 20, 58, respectively, are co-aligned thereby enabling the hook member 111 of lock bar 105 to fall inwardly, under the influence of the lock bar spring 120 and torsion spring 130, within the apertures 20 and 58 to thereby lock the link section 11 and lock-release section 12 together, as is best seen in Figure 2. The tab plate 80 need not be, and preferably is not, manually rotated outwardly during the locking operation, since this is done automatically as the link plate 40 strikes lock bar 105.

A helical ejector spring 135, having two end fingers 136 and 137, rotatably encloses torsion spring 130 and is contained within enlarged bore 91, as is best seen in Figure 4. Ejector spring retaining finger 136 is mounted within retaining slot 28 adjacent torsion spring finger 131 and is rotatably movable within said retaining slot, the finger 136 lying within the plane of the circumference of the spring 135 proper. The ejector finger 137 extends radially outward from the circumference of the ejector spring 135 to make approximately a 140° angle with the axis of finger 136. Ejector finger 137 abuts the rear edge 22 of ejector slot 21 when the link member 11 is disengaged, as is best seen in Figure 6.

Referring now especially to Figures 2, 3, or 6, a roll-pin mechanism transmits the outward motion imparted to the hood 78 in the direction shown in Figure 6 to the lock bar 105 thereby causing it to move outwardly from within apertures 20 and 58 during the unlocking operation.

The roll-pin mechanism comprises a circular roll-pin opening 140 formed intermediate the ends 106 and 111 of lock bar 105 which passes transversely therethrough, a pair of transversely aligned circular roll-pin holes 141, 142 formed in the frame side members 143, 144, respectively of frame 96, the said holes 141, 142 having a smaller diameter than roll-pin opening 140 but co-aligned therewith when the lock bar 105 is in locked position, and an elongated cylindrical roll-pin 145, the ends of which are stably mounted within said roll-pin holes, passing through the roll-pin opening 140. A roll-pin cavity 150 is provided in hood side plate 99 to enable the roll-pin 145 to be passed into roll-pin holes 141, 142.

As an outward force is applied upon the tab plate 80 in the direction of Figure 6, the frame 96 also moves outwardly carrying with it roll-pin 145. The outwardly moving roll-pin 145 strikes the wall of roll-pin opening 140 thereby lifting hook member 111 of lock bar 105 outwardly from within apertures 20 and 58 to unlock the buckle 10.

Describing now the locking and unlocking operations in detail, after the length of the belt 13 has been adjusted, the linking section 11 is slid into the channel 14 of the lock-release section 12 in the direction of the arrow in Figure 3, the leading edge 41 of said linking section striking the innerside 126 of lock bar 105, thereby forcing the hook member 111 from its position within aperture 20 of channel 14, as previously described.

As the link plate 40 moves further towards the forward edge 19 of channel 14, the lock bar 105 pivots about bolt 70, compressing lock bar spring 120, the upper leaf 121 of which is retained by hood 78, the said hood, in turn, being held inwardly by means of the torsion spring 130. Accordingly, slide-pivot opening 106 moves forwardly and downwardly until upper edge 106b thereof abuts bolt 70 and roll-pin 145 abuts roll-pin opening 140. The hook member 111 then contacts link plate 40 as it moves further in the direction of Figure 3.

Therefore, as soon as the leading edge 59 of aperture 58 is co-aligned with rear edge 62 of aperture 20, the hook member 111 falls inwardly and forwardly, under the influence of the above-described inward forces, into both apertures to thereby lock the linking section 11 with lock-release section 12.

Referring now to Figure 2, as the hook member 111 moves inwardly within apertures 20 and 58, the bolt 70 abuts the lower edge 106a of slide-pin opening 106, and the roll-pin 145 lies in the approximate center of roll-pin opening 140.

Simultaneously with the movement of linking section 11, in the direction of the arrow in Figure 3, to be locked the shoulder 61 is moved immediately adjacent ejector slot 21, striking the spring ejector finger 137 resting therein and moving it pivotally about bolt 70, as best seen in Figure 5. The movement thus imparted to spring 137 subjects the ejector spring 135 to considerable tension or torsion. As contact is made between link ears 45, 45a and side plates 16, 17 respectively, thereby limiting the forward movement of the shoulder 61, the ejector finger 137 is maintained under tension and abutting shoulder 61 for the entire time that the hook 111 of lock bar 105 locks the linking section 11 to the lock-release section 12.

Referring now especially to Figure 6, in the unlocking operation of the belt buckle 10 and in the disengaging operation of the linking section 11 from lock-release section 12, it is necessary only to apply an outward force upon manual tab plate 80. As the hood 78 is moved outwardly, the roll-pin 145 strikes the wall of lock bar roll-pin opening 140, thereby lifting the lock bar outwardly and removing the hook member 111 from within apertures 20 and 58.

The linking section 11, now being free to move, is immediately ejected from within the channel 14 of lock-release section 12 under the influence of ejector finger 137. Since the ejector finger is, as previously described, under considerable tension, its motion is directed towards the rearward edge 22 of ejector slot 21 to thereby relieve this tension. Thus, since ejector spring 135 is relatively unstressed when the ejector finger 137 abuts rearward edge 22 of slot 21, the ejector finger will ride in slot 21 until it abuts the said rearward edge 22, thereby forcing the shoulder 61 of link plate 40 past slot edge 22 in the direction of the arrow in Figure 6. The momentum thus imparted to the link plate 40 causes it to continue its motion so that it is completely disengaged from channel 14 of the lock-release member 12.

It will be noted that it is entirely possible, and probably advantageous in some instances, to have more than one ejector spring ejecting the link section 11 from the channel 14. For instance, a second ejector slot can be formed in the floor plate 15 of the channel 14 and aligned so that a second ejector spring finger rides therein to aid in ejecting the link section 11.

Many modifications of structure may be conceived that lie within the scope of this invention, one preferred embodiment only having been described. Accordingly, the scope of this invention is not to be limited by the embodiment shown and described herein, but is only to be limited by the appended claims.

We claim:
1. A safety belt buckle which comprises: a channel member; a hood pivotally movable about one end of said channel member; torsion spring means attached to said hood to force said hood inwardly towards said channel member; a linking member slidable within said channel member and beneath said hood; a spring-loaded locking member adapted to positively lock said channel member and said linking member when they assume a predetermined position with respect to each other; means for moving said locking member outwardly to unlock said channel member and said linking member; and a helical ejector spring having two ends, one end being retained within said channel, the other end adapted to move rearwardly to eject said linking member from within said channel member as said linking member and said channel member are unlocked.

2. A safety belt buckle which comprises: a channel member comprising a floor plate and side plates, said floor plate having an aperture located therein; a bolt mounted between said side plates; a lock bar rotatable on said bolt, having hook means affixed to the free end thereof; a lock bar spring mechanism located adjacent the underside of said hood adapted to exert an inward pressure upon said lock bar; contact means attached to said hood moving said lock bar outwardly with the outward movement of said hood; a link plate member having an aperture formed therein slidable within said channel member; a helical ejector spring having a retaining finger end and an ejector finger end, the retaining finger being retained within said channel member and the ejector finger abutting said link plate when said link plate lies within said channel member to be thereby placed under tension; means for aligning said link and channel member apertures thereby causing said spring-loaded lock bar to be forced inwardly into said apertures to lock said link and channel members; and handle means attached to said hood whereby when said handle means are forced outwardly, said lock bar moves outwardly from within said link and channel member apertures unlocking said link plate from said channel and said ejector finger ejects said link plate from said channel thereby automatically disengaging said safety belt buckle into two separate buckle members.

3. In a safety belt buckle of the type having a first buckle member slidable within a second buckle member to be positively interlocked therewith, an ejector mechanism which comprises: an ejector spring having two end fingers, one finger of which is retained within said second buckle member, the other finger of which contacts said first buckle member as it slides within said second buckle member to be moved thereby into a state of torsion causing said ejector spring to exert a force in a direction opposed to the direction of insertion of said first buckle member, said ejector spring ejecting said first buckle member from within said second buckle member simultaneously with the unlocking of said buckle members.

4. In a safety belt buckle of the type having a linking member slidable within a channel of a lock-release member, the said lock-release member having a positive locking mechanism including a spring-loaded lock bar pivotally mounted on a bolt transversely affixed within said channel adapted to lock said linking and lock-release members together under pressure, an ejector mechanism which comprises: a helical ejector spring rotatably mounted on said bolt and contained within said lock-release member having two end fingers, one of said fingers being retained within said channel, the other finger contacting said linking member as it is slidably received within said lock-release member to thereby cause said spring fingers to be placed under tension as said members are locked together, said other finger ejecting said linking member from within said channel of said lock-release member simultaneously with the unlocking of said members.

5. A safety belt buckle which comprises: a channel comprising a floor plate and side plates, said floor plate having an aperture located therein; a bolt rigidly mounted between said side plates; a lock bar rotatable on said bolt, having hook means affixed to the free end thereof; a lock-release hood pivotally mounted on said bolt; a lock bar spring mechanism located adjacent the underside of said hood adapted to exert an inward pressure upon said lock bar; contact means attached to said hood moving said lock bar outwardly with the outward movement of said hood; a torsion spring having two end fingers, one retaining end finger of said spring being retained within said channel, the other tension end finger being affixed to said housing under tension whereby an inward force is exerted on said release hood, the inward force being transmitted to said lock bar by said lock bar spring mechanism thereby causing said hook to be forced inwardly into said channel aperture; an ejector spring mounted on said bolt having its retaining end finger retained within said channel and the other ejector end finger free; a link plate member having an aperture formed therein slidable within said channel member whereby when said member is slid within said channel, said ejector finger is rotated about its axis by abutting said link member thereby increasing the torsion thereof; means for aligning said link and channel apertures thereby causing said spring-loaded lock bar to be forced inwardly into said apertures to lock said link and channel members; and handle means attached to said hood whereby when said handle means are forced outwardly, said lock bar moves outwardly from within said link and channel apertures unlocking said link plate from said channel and said ejector finger ejects said link plate from said channel thereby automatically disengaging said safety belt buckle into two separate pieces.

6. A safety belt buckle which comprises: a channel comprising a floor plate and a first and second side plates affixed to the sides thereof, said floor plate having a forward edge and a rearward edge and provided with a locking aperture and at least one ejector finger slot located therein, said slot having a forward end and a rearward end adjacent said floor plate forward and rearward edges, respectively, each of said side plates having first and second transversely aligned bolt holes formed near the forward edge therein, and at least the first of said side plates having a retaining slot formed therein adjacent the first of said bolt holes; adjustable belt-attaching means located near the rearward edge of said channel; a bolt rigidly mounted within said transversely aligned bolt holes; a lock bar pivotally mounted on said bolt and having a hook member affixed to the free end thereof; a lock bar release hood pivotally mounted on said bolt and having an under-housing slidably enclosing said lock bar to restrict its transverse slidable movement; a lock bar spring connecting the underside of said release hood with said lock bar whereby to force said lock bar inwardly as said hood is moved inwardly; contact means attached to said hood for moving said hook member of said lock bar outwardly with the outward movement of said hood; at least one inner torsion spring rotatably mounted on said bolt, one retaining end finger of said spring retained within said side plate retaining slot, the other end finger retained within said housing under tension whereby an inward force is continuously exerted on said release hood and is transmitted to said lock bar by said lock bar spring connection to cause said hook member to be forced inwardly towards said channel; at least one ejector spring rotatably mounted on said torsion spring, the retaining end finger of said spring being retained within said side plate retaining slot, the other ejector end finger riding in said ejector slot on said channel floor to abut the rearward edge of said slot; a link plate having a leading edge, a trailing edge, and first and second side edges, and being slidable within said channel so that said first side edge is adjacent said first side plate and a shoulder formed in at least the first of said side edges; a link aperture provided within said link plate; belt attaching means located near the said trailing edge of said link plate; means on said link plate arresting the movement of said link plate within said channel so that the said channel aperture and said link aperture are co-aligned, thereby causing said spring-loaded hook member to move inwardly therethrough to lock said link plate and channel member, and said inward movement of said link plate causing said shoulder to force said ejector finger forwardly under torsion; and a tab plate affixed to said hood which when forced outwardly causes said lock bar to move outwardly by means of contact wtih said contact means to thereby unlock said link plate from said channel floor plate causing said ejector finger to simultaneously move rearwardly to the rear edge of said ejector slot ejecting said link plate from said channel member and automatically separating said safety belt buckle into two buckle members.

7. A safety belt buckle which comprises: a channel member; a hood pivotally movable about one end of said channel member; a linking member slidable within said channel member and beneath said hood; a locking member adapted to positively lock said channel member and said linking member when they assume a predetermined position with respect to each other; means for moving said locking member outwardly to unlock said channel member and said linking member; and an ejector spring having two ends, one end being retained within said channel, the other end adapted to move rearwardly to eject said linking member from within said channel member as said linking member and said channel member are unlocked.

8. A safety belt buckle which comprises: a channel member; a hood pivotally movable about one end of said channel member; a linking member slidable within said channel member and beneath said hood; a locking member adapted to positively lock said channel member and said linking member when they assume a predetermined position with respect to each other; means for moving said locking member outwardly to unlock said channel member and said linking member; and an ejector spring having two ends, one end being retained within said channel, the other end adapted to move rearwardly from a position in torsion to a position of less torsion to eject said linking member from within said channel member as said linking member and said channel member are unlocked.

9. The buckle of claim 2 wherein said contact means includes a pin affixed to the underside of said hood passing through a bore in said lock bar, said bore having a diameter substantially larger than said pin whereby upon outward movement of said lock bar, said pin contacts the wall of said bore and moves the lock bar outwardly to overcome said spring-loading of the lock bar and to release said lock bar from said link plate and channel members.

References Cited in the file of this patent

UNITED STATES PATENTS

| | | |
|---|---|---|
| 2,003,205 | Kuhlemann | May 28, 1935 |
| 2,458,810 | Varney et al. | Jan. 11, 1949 |

FOREIGN PATENTS

| | | |
|---|---|---|
| 299,288 | Italy | July 27, 1932 |
| 335,431 | Great Britain | Sept. 25, 1930 |